(12) United States Patent
Altamura et al.

(10) Patent No.: US 6,409,414 B1
(45) Date of Patent: Jun. 25, 2002

(54) PIN FOR CONNECTING GEARS TO A SUPPORTING MEMBER, AND TRANSMISSION FEATURING SUCH A PIN

(75) Inventors: Paolo Altamura, Monopoli; Giovanni Oddone, Predosa, both of (IT)

(73) Assignee: Fiatavio S.p.A., Turin (IT)

( * ) Notice: Subject to any disclaimer, the term of this patent is extended or adjusted under 35 U.S.C. 154(b) by 0 days.

(21) Appl. No.: 09/501,432

(22) Filed: Feb. 10, 2000

(30) Foreign Application Priority Data

Feb. 12, 1999 (IT) ........................... TO99A0109

(51) Int. Cl.⁷ ............................... F16H 57/08
(52) U.S. Cl. .......................... 403/284; 74/410
(58) Field of Search ................ 403/284; 74/410, 74/411, 801

(56) References Cited

U.S. PATENT DOCUMENTS 3,943,787 A 3/1976 Hicks
6,260,430 B1 * 7/2001 Andrei ................ 74/410
6,261,181 B1 * 7/2001 Reichmann et al. ...... 74/411 X
6,301,986 B1 * 10/2001 Berky ................. 74/410

FOREIGN PATENT DOCUMENTS

DE 197 06 686 A 8/1998
EP 0 003 894 A 9/1978

* cited by examiner

Primary Examiner—Lynne H. Browne
Assistant Examiner—John R. Cottingham
(74) Attorney, Agent, or Firm—Kinney & Lange, P.A.

(57) ABSTRACT

A pin for connecting a gear to a supporting member has a first and a second longitudinal end portion connectable to the supporting member; a first intermediate portion extending from the first end portion; and a second intermediate portion extending from the second end portion, and which differs in size from the first intermediate portion and has a flexural strength differing from that of the first intermediate portion.

6 Claims, 2 Drawing Sheets

PIN FOR CONNECTING GEARS TO A SUPPORTING MEMBER, AND TRANSMISSION FEATURING SUCH A PIN

The present invention relates to a pin for connecting gears to a supporting member.

More specifically, the present invention relates to a supporting pin which may be used to advantage, though not exclusively, in epicyclic gear trains for transmitting severe loads in general, and in epicyclic gear trains of aircraft transmissions in particular, to which the following description refers purely by way of example.

BACKGROUND OF THE INVENTION

Aircraft transmissions normally comprise an epicyclic gear train in turn comprising a sun gear, a ring gear, and a number of planet wheels interposed between the sun and ring gears and supported on a planet carrier.

In most applications, the planet carrier comprises two substantially platelike elements positioned facing each other on opposite axial sides of the planet wheels, and connected integrally to each other by a number of the gear train in relative motion.

To eliminate the above drawbacks, dedicated supporting pins are used, which have opposite elastic end portions of the same size, which deform elastically alongside deformation of the platelike elements and respective tenons to ensure the gears mesh correctly at all times. Also, between the carrier and the supporting body, provision is and must be made for a load balancing assembly, which comprises a number of axial arms connected integrally to the supporting body; and, for each arm, a respective connecting member lying in a plane perpendicular to the sun and ring gear axes and through the center lines of the planet wheels.

Known balancing assemblies of the above type are particularly complex, are extremely expensive to both produce and maintain, and, being highly stressed, are subject to frequent breakdowns and malfunctioning.

SUMMARY OF THE INVENTION

It is an object of the present invention to provide a supporting pin designed to solve the aforementioned problems in a straightforward, low-cost manner.

According to the present invention, there is provided a pin for connecting a gear to a supporting member; the pin having a respective axis, and comprising a first and a second longitudinal end portion connectable to said supporting member; a first intermediate portion extending from said first end portion; and a second intermediate portion extending from said second end angularly equally spaced cross members or tenons normally integral with both the platelike elements. Each of the planet wheels is connected to the carrier by a respective supporting pin, the opposite ends of which are each connected to a respective platelike element, and to which the respective planet wheel is in turn normally connected via the interposition of a bearing, normally a friction bearing.

During operation of the gear train, the carrier is stressed by forces which, in some cases, result in deformation of the carrier and, in particular, in displacement of the two platelike elements with respect to each other.

Displacement of the platelike elements in turn results in deformation of both the tenons and the supporting pins, the axes of which pass from an ideal work or rest condition parallel to the axes of the sun and ring gears, to a real or critical work condition in which they form, with the sun and ring gear axes, an angle of other than zero and which varies according to the intensity of the forces transmitted.

Deflection of the pin axes and, hence, of the respective planet wheel axes with respect to the ring and sun gear axes results in uneven distribution of the contact pressures between the planet wheel teeth and those of both the sun and ring gear, which in turn results, not only in general malfunctioning of the gear train, but also in rapid wear of the contacting parts of portion; characterized in that said first and said second intermediate portion differ from each other in size and in flexural strength.

BRIEF DESCRIPTION OF THE DRAWINGS

A non-limiting embodiment of the invention will be described by way of example with reference to the accompanying drawings, in which.

DETAILED DESCRIPTION OF THE INVENTION

Figure 1:
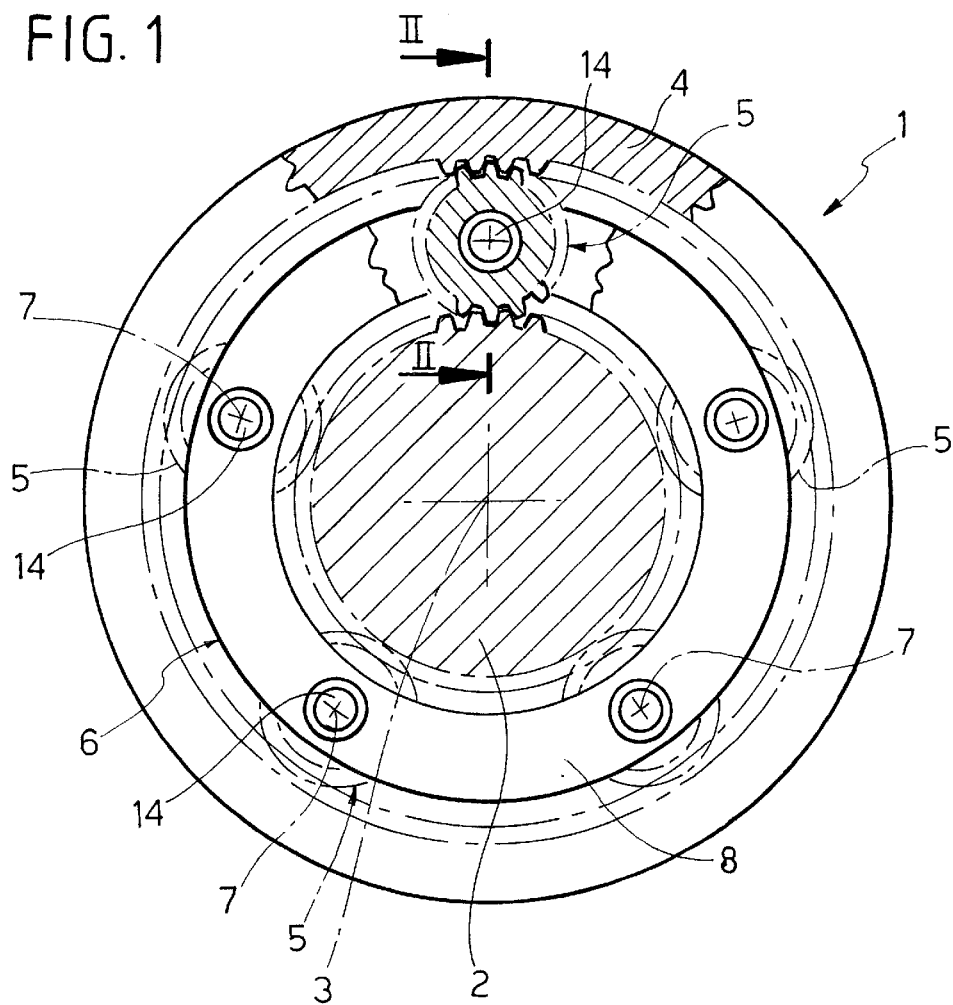
FIG. 1 shows schematically, and with parts removed for clarity, an epicyclic transmission featuring a number of supporting pins in accordance with the present invention.
Figure 2:
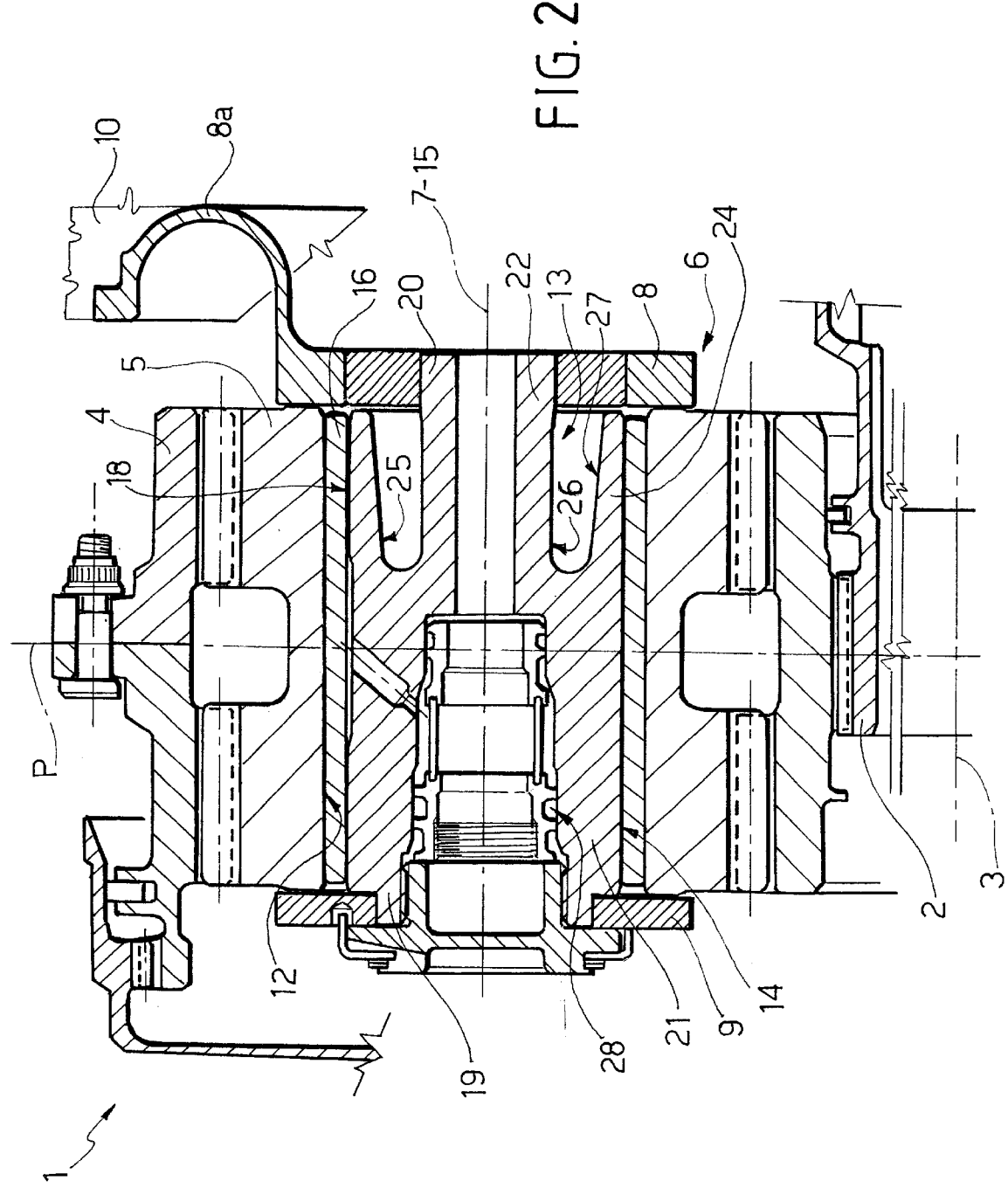
FIG. 2 shows a larger-scale section along line II—II in FIG. 1.

Number 1 in FIGS. 1 and 2 indicates as a whole an epicyclic transmission for an aircraft (not shown). Transmission 1 comprises a sun gear 2 rotating about a respective axis 3; a rotating ring gear 4 coaxial with axis 3; and a number of planet wheels 5—in the example shown, five—meshing with ring gear 4 and sun gear 2, and connected to a planet-carrier 6 so as to rotate about respective axes 7 parallel to one another and to axis 3.

Carrier 6 extends coaxially with axis 3, is formed in one piece from metal material, and comprises two facing platelike bodies 8 and 9 (FIG. 2). In the particular example shown, body 8 is connected integrally in known manner—e.g. by means of a bracket 8a and screws or pins not shown—to a fixed body 10 (shown schematically) supporting carrier 6. Carrier 6 also comprises a number of known tenons (not shown) extending axially between, and integral with, platelike bodies 8 and 9. In a variation not shown, body 8 is connected integrally to an output shaft, and ring gear 4 is connected integrally to a fixed body.

Each planet wheel 5 has a central axial through hole 12, and is connected to platelike bodies 8 and 9 of carrier 6 by a respective supporting device 13. As shown in FIG. 2, device 13 extends through hole 12, and comprises a supporting pin 14 having a respective axis 15; and a bushing 16 made of antifriction material and interposed between pin 14 and the relative planet wheel.

Pin 14 is asymmetrical with respect to a plane P (FIGS. 2 and 3) perpendicular to axis 15 and through the center line of pin 14, and is defined laterally by a cylindrical supporting surface 18 coaxial with axis 15 and having a straight generating line. Pin 14 comprises two opposite tubular longitudinal end portions 19 and 20, which, in the particular example shown, engage, with substantially no clearance, respective axial through holes formed in bodies 8 and 9. Alternatively, in a variation not shown, portion 19 engages the respective hole and is therefore connected integrally to body 9, while portion 20 simply rests against a support carried by body 8, so that pin 14 acts in the same way as an ordinary rod restrained at one end and resting against a support at the opposite end.

Figure 3:
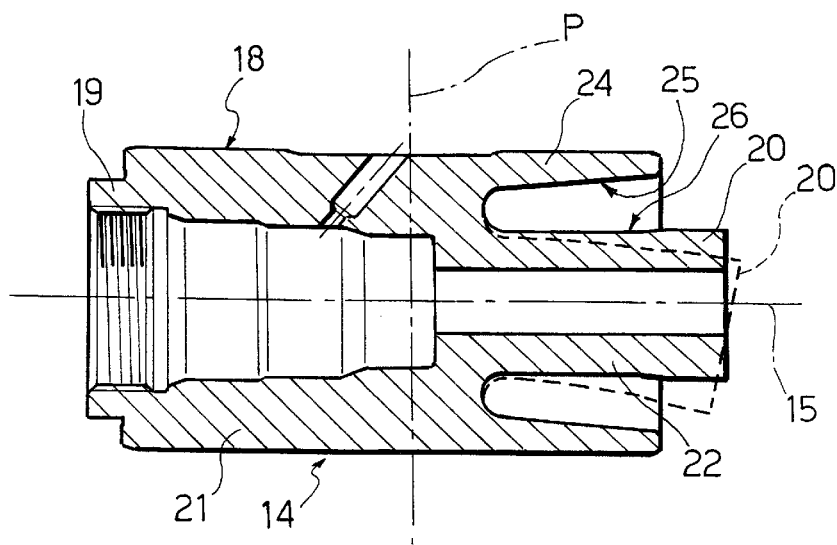
FIG. 3 shows a section of a detail in FIG. 2.

As shown in FIGS. 2 and 3, pin 14 also comprises two tubular cylindrical intermediate portions 21 and 22 extending from portions 19 and 20 respectively, and having respective outside diameters and different respective cross sections measured in respective planes parallel to plane P. More specifically, portion 21 has an outside diameter and a cross section greater than those of portion 22, and a much greater flexural strength than portion 22, or at least such that, when pin 14 is stressed in use, portion 22 is the only one to undergo substantial elastic deformation.

As shown in FIGS. 2 and 3, pin 14 also comprises a further tubular portion 24, which is defined externally by surface 18, projects from intermediate portion 21, and surrounds intermediate portion 22. Tubular portion 24 is defined internally by a conical surface 25, which extends facing an outer lateral surface 26 of intermediate portion 22 and has an inside diameter tapering towards end portion 19. Surface 25 is spaced apart from lateral surface 26, and defines, together with surface 26, a cavity 27 in which portion 22 flexes in use.

As shown in FIG. 2, pin 14 houses a known lubricating device 28, not described in detail, for supplying lubricating fluid between pin 14 and bushing 16.

Each pin 14 acts in the same way as an ordinary variable-section rod restrained at least one end, and the different intermediate resisting sections of pin 14 are so sized that, when the loads transmitted by planet wheels 5 to carrier 6 are such as to deform platelike bodies 8 and 9 and the tenons (not shown) of carrier 6, portion 22 flexes as shown by the dash line in FIG. 3, while both portions 21 and 24 remain substantially undeformed. In fact, by virtue of the particular connection of end portions 19 and 20 to platelike bodies 8 and 9, and of the deformation of platelike bodies 8 and 9 themselves, the deflection of portion 22 generates a reaction on body 9 in opposition to the forces acting on relative planet wheel 5, to enable surface 18 of pin 14 to move while remaining parallel to itself and, hence, planet wheel 5 to mesh correctly at all times with both sun gear 2 and ring gear 4. Maintaining a substantially unchanged mesh condition between the planet wheels and the sun and ring gears alongside variations in the deformation of carrier 6 prevents the generation of undesired, unpredictable forces between the meshing teeth and local deformation of bushings 16, which would obviously result in steady, rapid impairment not only of the epicyclic gear train but also of the transmission as a whole.

As compared with known solutions, the particular geometry of pins 14 also provides for greatly reducing both the manufacturing and running cost of transmission 1. That is, the geometry of pins 14, and in particular the fact that each comprises only one reaction portion which is elastically deformable when stressed, enables only one of the two platelike bodies—in the example shown, body 8—to be connected directly to the carrier 6 supporting body, with no need, as in known solutions, for complex, high-cost load balancing devices.

Clearly, changes may be made to pins it as described herein without, however, departing from the scope of the present invention. In particular, the various portions of pins 14 may be formed differently from those described by way of example, or may be replaced by respective portions performing equivalent functions.

What is claimed is:

1. A pin (14) for connecting a gear (5) to a supporting member (6); the pin (14) having a respective axis (15), and comprising:

a first (19) and a second (20) longitudinal end portion connectable to said supporting member (6);

a first intermediate portion (21) extending from said first end portion (19); and a second intermediate portion (22) extending from said second end portion (20);

characterized in that said first (21) and said second (22) intermediate portion differ from each other in size and in flexural strength, wherein said first intermediate portion (21) has a cross section, measured in a plane perpendicular to said axis (15), greater than a cross section of said second intermediate portion (22) measured in a further plane parallel to said plane; and wherein the pin is defined laterally by a cylindrical supporting surface (18), and by also comprising a single tubular portion (24) projecting, coaxially with said axis (15), from said first intermediate portion (21), and surrounding said second intermediate portion (22); said single tubular portion (24) being defined externally by said cylindrical surface (18).

2. A pin as claimed in claim 1, characterized by being asymmetrical with respect to a plane (P) perpendicular to said axis (15) and through the center line of said pin (14).

3. A pin as claimed in claim 1, characterized in that said single tubular portion (24) is defined internally by a surface (25) facing an outer lateral surface (26) of said second intermediate portion (22) and spaced apart from said outer lateral surface (26); said second intermediate portion (22) being deformed, in use, inside said single tubular portion (24).

4. A mechanical transmission (1) comprising:

a gear (5);

a supporting member (6), wherein the supporting member (6) comprises:

a first (8) and a second (9) substantially platelike portion facing and connected to each other with the gear (5) interposed between said first (8) and said second (9) portion; and a pin (14) connecting the gear (5) to the supporting member (6), the pin (14) having a respective axis (15), the pin (14) comprising:

a first longitudinal end portion (19) connected to said second platelike portion (9); and a second longitudinal end portion (20) connected to said supporting member (6);

a first intermediate portion (21) extending from said first end portion (19); and a second intermediate portion (22) extending from said second end portion (20), wherein the first intermediate portion (21) and the second intermediate portion (22) are cylindrical;

characterized in that said first (21) and said second (22) intermediate portion differ from each other in size and in flexural strength, wherein said first intermediate portion (21) has a cross section, measured in a plane perpendicular to said axis (15), greater than a cross section of said second intermediate portion (22) measured in a further plane parallel to said plane; and wherein the pin is defined laterally by a cylindrical supporting surface (18), and by also comprising a single tubular portion (24) projecting, coaxially with said axis (15), from said first intermediate portion (21), and surrounding said second intermediate portion (22); said single tubular portion (24) being defined externally by said cylindrical surface (18).

5. The mechanical transmission (1) of claim 4, further including:

connecting means (8a) for connecting said supporting member (6) directly to a connecting body (10); said connecting means (8a) being interposed between one (8) of said platelike portions (8) (9) and said connecting body (10).

6. The mechanical transmission of claim 4, further including:

connecting means (8a) for connecting said supporting member (6) directly to a connecting body (10); said connecting means (8a) being interposed between one (8) of said platelike portions (8) (9) and said connecting body (10);

characterized that one (8) of said platelike portions (8) (9) is connected integrally to said connecting body (10).

* * * * *

UNITED STATES PATENT AND TRADEMARK OFFICE
CERTIFICATE OF CORRECTION

PATENT NO. : 6,409,414 B1
DATED : June 25, 2002
INVENTOR(S) : Paolo Altamura et al.

It is certified that error appears in the above-identified patent and that said Letters Patent is hereby corrected as shown below:

Column 1,
Lines 23-24, delete

"the gear train in relative motion" and insert -- angularly equally spaced cross members or tenons normally integral with both the platelike elements. Each of the planet wheels is connected to the carrier by a respective supporting pin, the opposite ends of which are each connected to a platelike element, and to which the respective planet wheel is in turn normally connected via the interposition of a bearing, normally a friction bearing.

During operation of the gear train, the carrier is stressed by forces which, in some cases, result in deformation of the carrier and, in particular, in displacement of the two platelike elements with respect to each other.

Displacement of the platelike elements in turn results in deformation of both the tenons and the supporting pins, the axes of which pass from an ideal work or rest condition parallel to the axes of the sun and ring gears, to a real or critical work condition in which they form, with the sun and ring gear axes, an angle of other than zero and which varies according to the intensity of the forces transmitted.

Deflection of the pin axes and, hence, of the respective planet wheel axes with respect to the ring and sun gear axes results in uneven distribution of the contact pressures between the planet wheel teeth and those of both the sun and ring gear, which in turn results, not only in general malfunctioning of the gear train, but also in rapid wear of the contacting parts of the gear train in relative motion.--

Column 1, lines 52-67 to Column 2, lines 1-10, delete "angularly equally spaced cross members or tenons normally integral with both the platelike elements. Each of the planet wheels is connected to the carrier by a respective supporting pin, the opposite ends of which are each connected to a platelike element, and to which the respective planet wheel is in turn normally connected via the interposition of a bearing, normally a friction bearing.

During operation of the gear train, the carrier is stressed by forces which, in some cases, result in deformation of the carrier and, in particular, in displacement of the two platelike elements with respect to each other.

Displacement of the platelike elements in turn results in deformation of both the tenons and the supporting pins, the axes of which pass from an ideal work or rest condition parallel to the axes of the sun and ring gears, to a real or critical work condition in which they form, with the sun and ring gear axes, an angle of other than zero and which varies according to the intensity of the forces transmitted.

UNITED STATES PATENT AND TRADEMARK OFFICE
CERTIFICATE OF CORRECTION

PATENT NO. : 6,409,414 B1
DATED : June 25, 2002
INVENTOR(S) : Paolo Altamura et al.

It is certified that error appears in the above-identified patent and that said Letters Patent is hereby corrected as shown below:

Column 1, lines 52-67 to Column 2, lines 1-10, cont'd,

Deflection of the pin axes and, hence, of the respective planet wheel axes with respect to the ring and sun gear axes results in uneven distribution of the contact pressures between the planet wheel teeth and those of both the sun and ring gear, which in turn results, not only in general malfunctioning of the gear train, but also in rapid wear of the contacting parts of"

Signed and Sealed this

Sixth Day of April, 2004

JON W. DUDAS
*Acting Director of the United States Patent and Trademark Office*